US011280998B2

(12) United States Patent
Forkert

(10) Patent No.: US 11,280,998 B2
(45) Date of Patent: Mar. 22, 2022

(54) AIRBORNE SCANNING INSTRUMENT AND SATELLITE DEVICE WITH ANGLED MIRROR AND SHAFT AND RELATED METHODS

(71) Applicant: Eagle Technology, LLC, Melbourne, FL (US)

(72) Inventor: Richard D. Forkert, Fort Wayne, IN (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 0 days.

(21) Appl. No.: 16/827,820

(22) Filed: Mar. 24, 2020

(65) Prior Publication Data

US 2021/0302720 A1 Sep. 30, 2021

(51) Int. Cl.
*G02B 26/10* (2006.01)
*H04B 7/185* (2006.01)
*B64G 1/66* (2006.01)

(52) U.S. Cl.
CPC .......... *G02B 26/105* (2013.01); *B64G 1/66* (2013.01); *H04B 7/18515* (2013.01); *H04B 7/18519* (2013.01)

(58) Field of Classification Search
CPC ........ G02B 26/105; G02B 26/10; B64G 1/66; H04B 7/18515; H04B 7/18519; G03B 15/00; G03B 15/006; G03B 15/06
See application file for complete search history.

(56) References Cited

U.S. PATENT DOCUMENTS

| | | | |
|---|---|---|---|
| 4,791,297 A | 12/1988 | Savoca et al. | |
| 4,989,086 A * | 1/1991 | Schaff | G01C 11/02 |
| | | | 250/334 |
| 5,296,972 A | 3/1994 | McKinley | |
| 5,420,789 A | 5/1995 | Fulton | |
| 8,368,774 B2 | 2/2013 | Grycewicz | |
| 2004/0263418 A1 * | 12/2004 | Kuroda | H01Q 3/06 |
| | | | 343/909 |

(Continued)

FOREIGN PATENT DOCUMENTS

| | | |
|---|---|---|
| CN | 1310494 | 3/2005 |
| CN | 202142644 U * | 2/2012 |

(Continued)

OTHER PUBLICATIONS

Jeffery J. Puschell, Ph.D. "Visible Infrared Imaging Radiometet Suite (VIIRS): improvements in imaging radiometry enabled by innovation driven by requirements" Presented at the CORP Science Symposium at CIRA; Jul. 19, 2016; pp. 30.

*Primary Examiner* — Lewis G West
(74) *Attorney, Agent, or Firm* — Allen, Dyer, Doppelt + Gilchrist, P.A.

(57) ABSTRACT

An airborne scanning instrument may include a scanning mirror configured to be carried by an airborne platform and having a major reflective surface to define a scanning path directed toward Earth. The airborne scanning instrument may include a shaft configured to rotate the scanning mirror about a shaft axis. The major reflective surface of the scanning mirror may be tilted at a first angle from the shaft axis, and the shaft axis may be tilted at a second angle relative to horizontal. The airborne scanning instrument may include a detector aligned with the scanning mirror to define a detector path therewith.

27 Claims, 5 Drawing Sheets

(56) References Cited

U.S. PATENT DOCUMENTS

2009/0251773 A1* 10/2009 Danziger ........... G02B 26/0816
359/367
2015/0229032 A1* 8/2015 Liu ........................ H01Q 3/20
343/766
2018/0306945 A1* 10/2018 Ryu ........................ G01W 1/08

FOREIGN PATENT DOCUMENTS

| CN | 105415371 A | * | 3/2016 |
| CN | 105068085 | | 8/2017 |
| WO | WO 2012/020413 | | 2/2012 |

* cited by examiner

AIRBORNE SCANNING INSTRUMENT AND SATELLITE DEVICE WITH ANGLED MIRROR AND SHAFT AND RELATED METHODS

TECHNICAL FIELD

The present disclosure relates to the field of remote sensing, and, more particularly, to a scanning instrument and related methods.

BACKGROUND

Remote sensing systems may use satellites in Low Earth Orbit (LEO) and Medium Earth Orbit (MEO). LEO-based systems are particularly well suited for remote sensing because of their proximity to the Earth Surface. MEO-based systems are well suited for constellations of remote sensing satellites due to the reduced number of satellites required to achieve desired revisit intervals. In both orbit ranges, the satellites move across the Earth surface requiring that the sensed data be collected along the orbit path. This is also true for instruments mounted on airborne platforms that move through the atmosphere. These orbit motions are in contrast to geosynchronous orbit satellites that stay stationary above a point on the Earth as they orbit.

In remote sensing applications, the instrument architecture is of interest because it drives satellite cost, and capabilities. In general, an instrument architecture that is designed for LEO or MEO orbits, which move over the Earth surface, may be one of three types: 1) point-scanner where a single detector is quickly scanned in the cross-track direction similar to legacy raster scan televisions; 2) whisk-broom scanner where a linear array of detectors are scanned, which may increase the number of lines collected for each scan and reduce the scan rate; and 3) push-broom where a linear array of detectors span the cross-track dimension of the swath simultaneously collecting one or more lines, which may increase the sample time and does not involve scanning.

SUMMARY

Generally, an airborne scanning instrument may include a scanning mirror configured to be carried by an airborne platform, for example, a LEO satellite platform, and having a major reflective surface to define a scanning path directed toward Earth. The airborne scanning instrument may comprise a shaft configured to rotate the scanning mirror about a shaft axis. The major reflective surface of the scanning mirror may be tilted at a first angle from the shaft axis, and the shaft axis may be tilted at a second angle relative to horizontal. The airborne scanning instrument may include a detector aligned with the scanning mirror to define a detector path therewith.

More specifically, the detector path may be tilted at a third angle relative to a nadir line. In some embodiments, the airborne scanning instrument may include a motor coupled to the shaft, and a controller configured to operate the motor for scanning. The airborne scanning instrument may include an optical element between the scanning mirror and the detector.

Also, the optical element may comprise at least one of a telescope and a fold mirror. For example, the first angle may be within a range of 0°-45°. The second angle may be within a range of ±45°. The detector may be sensitive to radiation in an optical range. The airborne platform may comprise one of a low earth orbit (LEO) satellite platform or a medium earth orbit (MEO) satellite platform.

Another aspect is directed to a satellite device comprising a satellite platform, a wireless transceiver carried by the satellite platform, and a scanning instrument carried by the satellite platform, and coupled to the wireless transceiver. The scanning instrument may include a scanning mirror having a major reflective surface to define a scanning path directed toward Earth, and a shaft configured to rotate the scanning mirror about a shaft axis. The major reflective surface of the scanning mirror may be tilted at a first angle from the shaft axis, and the shaft axis may be tilted at a second angle relative to horizontal. The scanning instrument may include a detector aligned with the scanning mirror to define a detector path therewith.

Another aspect is directed to a method of making an airborne scanning instrument. The method may include positioning a scanning mirror to be carried by an airborne platform and having a major reflective surface to define a scanning path directed toward Earth. The method may comprise coupling a shaft to rotate the scanning mirror about a shaft axis. The major reflective surface of the scanning mirror may be tilted at a first angle from the shaft axis, and the shaft axis may be tilted at a second angle relative to horizontal. The method may include aligning a detector with the scanning mirror to define a detector path therewith.

Yet another aspect is directed to a method of operating an airborne scanning instrument. The method may include providing a scanning mirror to be carried by an airborne platform. The scanning mirror may have a major reflective surface to define a scanning path directed toward Earth. The method may comprise rotating the scanning mirror via a shaft and about a shaft axis. The major reflective surface of the scanning mirror may be tilted at a first angle from the shaft axis, and the shaft axis may be tilted at a second angle relative to horizontal. The method may comprise operating a detector aligned with the scanning mirror to define a detector path therewith.

DETAILED DESCRIPTION

Figure 1:
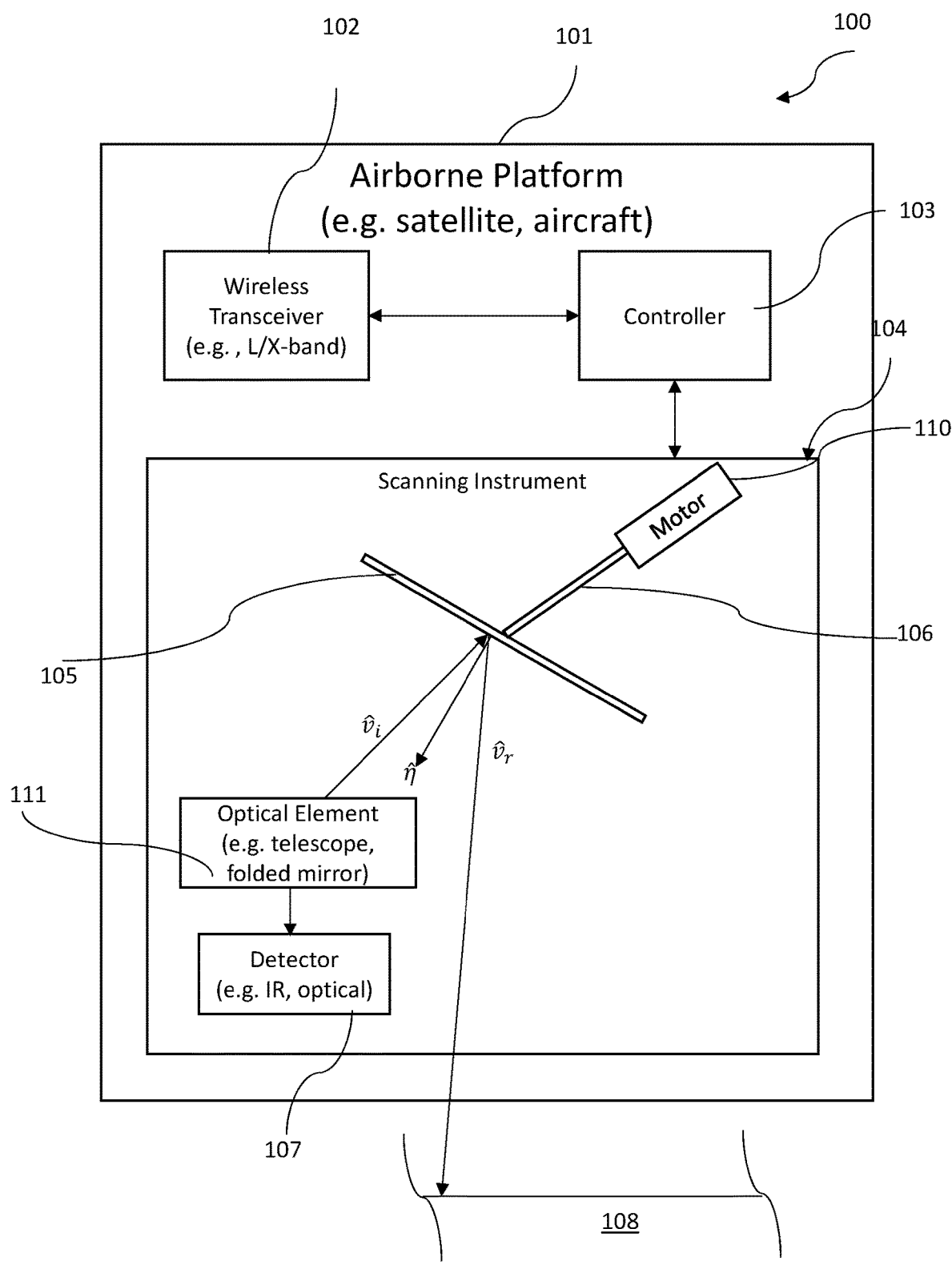
FIG. 1 is a schematic diagram of an airborne device, according to the present disclosure.

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout.

Each of the above noted existing architecture types has potential advantages and disadvantages that are primarily dependent on the number of detector elements collecting the scene. A system with fewer elements may reduce cost in the detector array, but may require faster sample collection that impacts the relative radiometric quality of the data because of the signal level available from using the shorter sample times. This can be mitigated by using a larger optical aperture, but this may add size, weight and cost to the instrument. A system with many elements improves the radiometric quality because there is more time to collect each pixel, however, large detector arrays become expensive because each detector element must pass a minimum collection quality threshold, which is challenging when imaging in the infrared with typical technologies.

Early point-scanning instrument, such as the Advanced Very-High-Resolution Radiometer (AVHRR), were used because the detector technologies were being developed and obtaining even a single high-quality detector was a challenge. As technologies have improved, linear arrays of high-quality detectors were possible and used in whiskbroom instruments such as Visible Infrared Imaging Radiometer Suite (VIIRS). Even larger arrays are possible in the visible range, which support push-broom instruments; however, using these technologies are still expensive for the infrared range. Two-dimensional arrays are also available, but require a step and stare collection approach for LEO instruments. Currently, a potentially advantageous trade for quality, cost, and instrument complexity remains to be the whisk-broom instrument using moderate-sized arrays until the detector array technologies developments make the push-broom instrument cost effective. This is especially true for the infrared range, which is very useful for remote sensing applications, such as weather.

Point-scanning instruments can use simple scanning mechanisms that have worked well to produce good quality data. These systems did not need to account for the detector element rotation; however, the projection of the element on the Earth surface does grow at the edge-of-swath. This impacts resolution, where the center-of-scan has a higher resolution than the edge-of-swath. If the swath width is limited, and the system is designed for the edge-of-swath resolution, this may be acceptable.

Using the same simple scanning mechanisms on a whiskbroom style instrument may present a problem in that the linear detector array projection is rotated on the ground as it is scanned to the edge-of-swath. This rotation along with the inevitable scaling makes image collection challenging for these legacy scanners. Several approaches have been used in the past that involved complex mechanisms to reverse this rotation, but these may add size and mass, which significantly increase cost for space-based missions.

The embodiments of the present disclosure may resolve these issues by allowing the scanner shaft, mirror-to-shaft mounting, and view angles to be tilted in the along-track direction. Various collection characteristics, such as projected detector array row and column rotation angles, scan-line path deviation, and scan mirror angle-of-incidence ranges, can be optimized using these degrees of freedom in design. This provides an approach that limits the linear array projection rotation while only requiring a single scan mirror with its motor and position encoder which makes it the most cost-effective approach. The embodiments of the present disclosure may be oriented toward space-based and aerial instruments for view the Earth surface, but also has applications for any scanning type camera.

Figure 2:
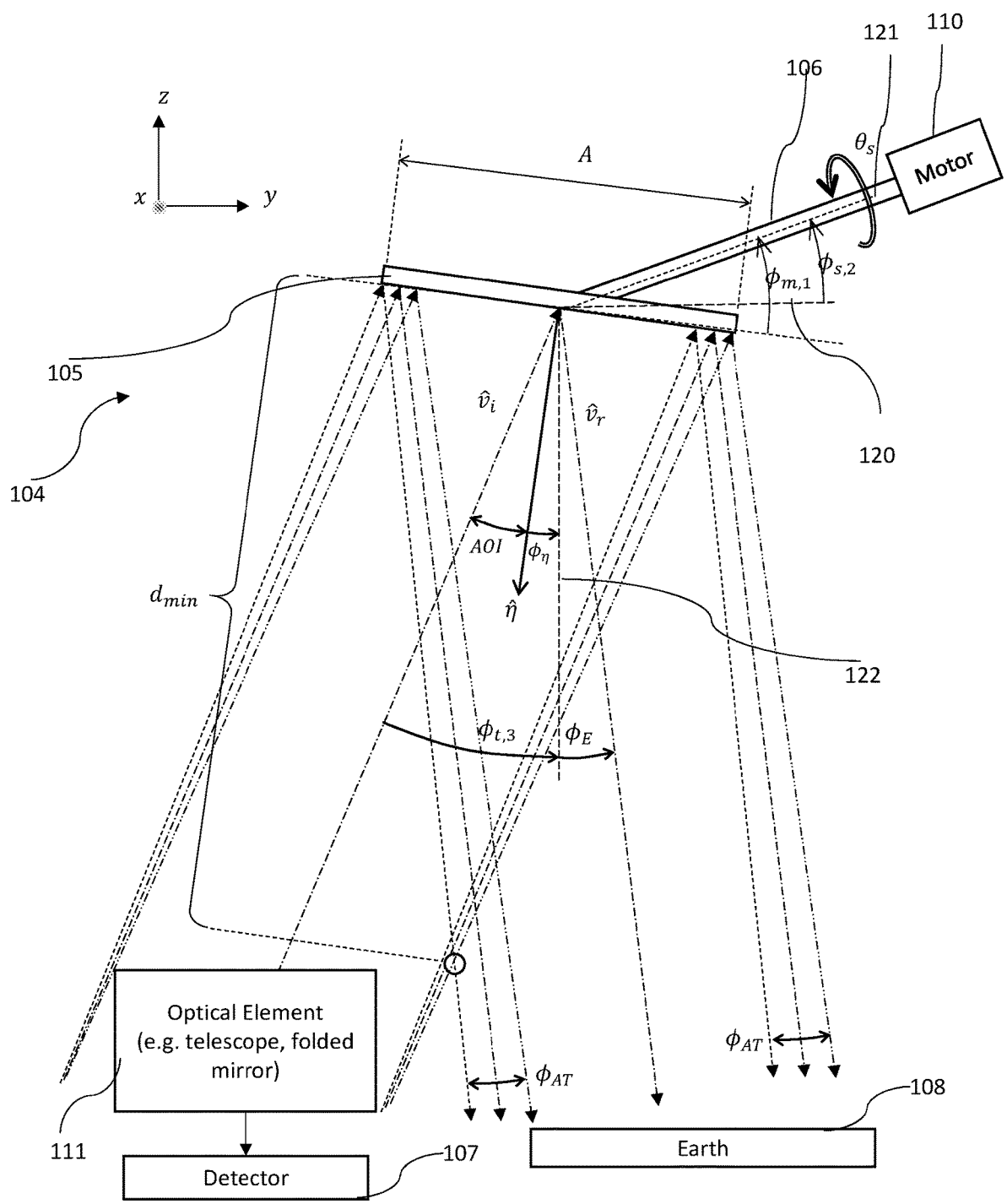
FIG. 2 is a schematic diagram of the scanning instrument from the airborne device of FIG. 1.

Referring initially to FIGS. 1-2, an airborne device 100 according to the present disclosure is now described. The airborne device 100 illustratively comprises an airborne platform 101. The airborne platform 101 may comprise a low earth orbit (LEO) satellite platform, a medium earth orbit (MEO) satellite platform, a high earth orbit satellite platform, or an aircraft platform, such as an unmanned aerial vehicle (UAV).

The airborne device 100 illustratively includes a wireless transceiver 102 carried by the airborne platform 101, a controller 103 carried by the airborne platform and coupled to the wireless transceiver, and a scanning instrument 104 carried by the airborne platform and coupled to the wireless transceiver. For example, the wireless transceiver 102 may comprise one or more of an L-band transceiver, and an X-band transceiver. Of course, these frequency bands are exemplary and other frequency bands could be used alternatively or additionally.

As will be appreciated, the airborne device 100 and the scanning instrument 104 are above the Earth 108 at a target altitude. In particular, as perhaps best seen in FIG. 2, a nadir line 122 extends from the airborne device 100 to a nadir point on Earth 108. Also, the controller 103 is configured to determine a geolocation of the nadir, and an orientation of the airborne device 100 while in operation.

The scanning instrument 104 illustratively comprises a scanning mirror 105 having a major reflective surface to define a scanning path $\hat{v}_r$ directed toward the Earth 108. In particular, the scanning mirror 105 may comprise a flat mirror in some embodiments. As shown in FIGS. 1-2, line $\hat{\eta}$ represents a normal angle from the major reflective surface of the scanning mirror 105, which has angular difference of $\phi_n$ from the nadir line 122.

The scanning instrument 104 illustratively comprises a shaft 106 configured to rotate the scanning mirror 105 about a shaft axis 121. The major reflective surface of the scanning mirror 105 is tilted at a first angle $\phi_{m,1}$ from the shaft axis 121. The shaft axis 121 is tilted at a second angle $\phi_{s,2}$ relative to horizontal 120. For example, the first angle $\phi_{m,1}$ may be within a range of 0°-45°. The second angle $\phi_{s,2}$ may be within a range of ±45° (i.e. 90° range). In some embodiments, the second angle $\phi_{s,2}$ is fixed within the range during manufacture, and is not adjustable in operation. In other embodiments, the scanning instrument 104 may include another motor to adjust the second angle $\phi_{s,2}$ during operation.

The scanning instrument 104 illustratively comprises a detector 107 aligned with the scanning mirror 105 to define a detector path $\hat{v}_i$ therewith. In particular, the detector 107 is aligned at an angle of incidence AOI from the normal line $\hat{\eta}$ of the scanning mirror 105. It should be appreciated that the scanning path $\hat{v}_r$ and the detector path $\hat{v}_i$ are shown in the direction of a scanning view ray, i.e. the ray extends from the optical element 111 to the Earth 108. The detector 107 may be sensitive to radiation in an optical range. The optical range may comprise at least an infrared range, an ultraviolet range, and a visible radiation range. Of course, these frequency ranges are merely exemplary and other ranges could be used depending on the application.

The detector path $\hat{v}_i$ is illustratively tilted at a third angle $\phi_{t,3}$ relative the nadir line 122. The third angle $\phi_{t,3}$ may be within a range of 0°-45°. The first angle $\phi_{m,1}$, the second angle $\phi_{s,2}$, and the third angle $\phi_{t,3}$ are aligned with the plane of the shaft 106 and the nadir line 122.

In the illustrated embodiment, the scanning instrument 104 illustratively comprises a motor 110 coupled to the shaft 106 and configured to selectively set a shaft rotation angle $\theta_s$ of the shaft about the shaft axis 121. The controller 103 is configured to operate the motor 110 for scanning by rotating the shaft 106 and the scanning mirror 105 in a serpentine fashion, moving the scanning mirror left and right in a controlled fashion. As will be appreciated, the speed/rotations per minute of the shaft 106 for the scanning operation is based upon target altitude of the airborne scanning instrument 104. Also, the scanning mirror 105 is tilted at a fourth angle equal to $\phi_{m,1}$-$\phi_{s,2}$ relative to horizontal 120 only when the shaft rotation angle $\theta_s$ is zero and the scanning mirror is pointed at the nadir line 122. When the shaft rotation angle $\theta_s$ is non-zero, the scanning mirror 105 is not tilted at the fourth angle relative to horizontal 120.

The airborne scanning instrument 104 illustratively comprises an optical element 111 between the scanning mirror 105 and the detector 107. Also, the optical element 11 may comprise at least one of a telescope (e.g. an aperture telescope) and a fold mirror. The view of the airborne scanning instrument 104 can be tilted in order to achieve desired performance metrics such as, row-to-scan path rotation, column-to-scan path perpendicularity, deviation from a nominal scan path, and the forward/back look angle of the scan path from nadir.

Another aspect is directed to a method of making an airborne scanning instrument 104. The method includes positioning a scanning mirror 105 to be carried by an airborne platform 101 and having a major reflective surface to define a scanning path $\hat{v}_r$ directed toward Earth 108. The method comprises coupling a shaft 106 to rotate the scanning mirror 105 about a shaft axis 121. The major reflective surface of the scanning mirror 105 is tilted at a first angle $\phi_{m,1}$ from the shaft axis 121. The shaft axis 121 is tilted at a second angle $\phi_{s,2}$ relative to horizontal 120. The method includes aligning a detector 107 with the scanning mirror to define a detector path $\hat{v}_i$ therewith.

Advantageously, the scanning instrument 104 may comprise a single motor 110 (i.e. motor/encoder) and a single scanning mirror 105. This may reduce the size and weight of the airborne device 100. Also, the scanning mirror 105 has a reduced size as compared to paddle-wheel and barrel-roll approaches for an equivalent optical system.

The selection of scanner parameters may allow for collection of nominal scanlines. This may be optimized for either focal plane array (FPA) projection column tilt, row tilt or scanline path deviation. This approach is equivalent to an instrument executing standard nadir-intersection scanlines, and may provide low FPA projection rotation to the scanline.

The airborne device 100 may also provide robust radiometric performance due to the smaller angled of incidence (AOI) range. The airborne device 100 may also provide better absolute calibration by limiting scan mirror reflectivity variation, reduced scan mirror contamination, and reduced polarization effects.

The airborne device 100 may also have lower costs due to low rotation of FPA projection, which allows the detector element selection to increase FPA yield. This may also eliminate the need for single column selection, which would result in very low FPA yield causing high FPA costs for even modest sized arrays. The airborne device 100 may also support time-delayed integration (TDI), which improves flexibility.

Figure 3:
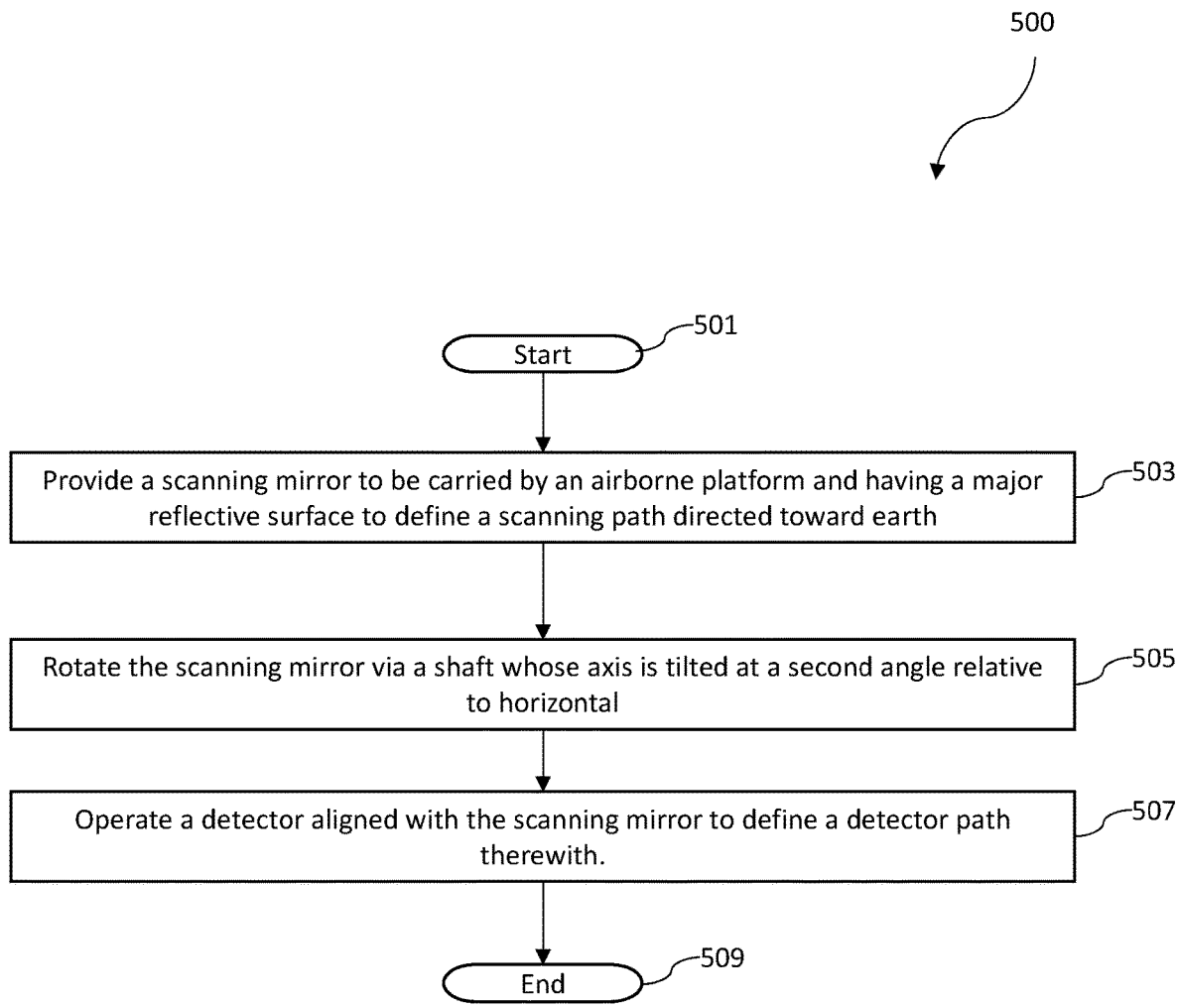
FIG. 3 is a flowchart of a method for operating the airborne device of FIG. 1.

Referring now to FIGS. 1-2 & 3, another aspect is directed to a method of operating an airborne scanning instrument 104, which begins at Block 501 of a flowchart 500. The method includes providing a scanning mirror 105 to be carried by an airborne platform 101 and having a major reflective surface to define a scanning path $\hat{v}_r$ directed toward Earth 108 at Block 503. The method comprises rotating the scanning mirror 105 via a shaft 106 and about a shaft axis 121. The major reflective surface of the scanning mirror 105 is tilted at a first angle $\phi_{m,1}$ from the shaft axis 121. The shaft axis 121 is tilted at a second angle $\phi_{s,2}$ relative to horizontal 120 at Block 505. The method comprises operating a detector 107 aligned with the scanning mirror 105 to define a detector path $\hat{v}_i$ therewith at Blocks 507, 509.

In the following, a brief description of existing approaches and potential drawbacks are now discussed.

The 45-degree barrel-roll scanner is used on the AVHRR devices, which are single detector element LEO instruments that have been in service since the 1970s. The scanner may include a single mirror mounted at 45 degrees to a horizontal shaft, whose axis is aligned with the track of the instrument. This allows the scanner to move across the track to collect single pixels in a raster-like motion. On AVHRR devices, the scan mirror is rotated at a constant rate in one direction making the mechanism very simple. The potential disadvantage of this scanner is that it rotates the image plane projection making it difficult to use with linear detector arrays.

Similar to the 45-degree barrel-roll scanner, the paddle wheel has a horizontal shaft that is aligned with instrument track; however, the mirror is mounted flat. The telescope views the scan mirror from the side aligned with the cross-track direction. This type of scanner is used on the Moderate Resolution Imaging Spectroradiometer (MODIS) instrument. The potential advantage of the paddle-wheel is that it is a simple approach that may require only one motor and one position encoder and does not rotate the image plane projection. The potential disadvantage is the range of angle-of-incidence on the scan mirror is large and contributes to a significant amount of polarization, which may make calibration over the life of instrument challenging. As particulates gather on the scan mirror surface over the life of the instrument, they change s and p reflectance properties of the mirror, causing changes in the polarization performance. Also, the angle of incidence (AOI) range may require careful calibration to reverse the change in reflectance from one end of the swath to the other.

The half-angle mirror (HAM) de-rotating scanner may include a scanning telescope that feeds another scanning mirror rotating at half the angular rate of the telescope to feed a re-imaging telescope that focuses the scene on the detector image plane. This scanner type is used on VIIRS devices. The scanning telescope was used to control stray light. This can be simplified to be a scanning mirror if stray light is not an issue. This system may not significantly rotate the image plane projection, though there is a slight rotation that is unavoidable due to the off-axis nature of the system. The potential disadvantage to this scanner is that it may require two motors and two high-precision position encoder and coordination between the scanning telescope and the half-angle mirror. This may significantly add to the size, mass, and cost of the instrument.

Optical de-rotators can be placed in the optical path to correct for the rotation of a simpler scanner, such as the 45-degree barrel roll scanner. The de-rotator may require an extra motor and position encoder so that it can be rotated in coordination of the scan mirror, as is the case with the half-angle mirror de-rotating scanner, which may add size, mass, and cost to a system.

The K-mirror de-rotator may include three mirrors arranged in a K that invert the image. When this device is rotated, this inverted image rotates in the same direction at twice the angular rate. This action allows a rotated image to be de-rotated by coordinating the rotation of the de-rotator with the rotation of the image plane rotation. The potential disadvantage of this optical device is that it is high polarizing because of the high AOI on the mirrors in the same orientation. Also, the diameter of the device is large compared to the optical path diameter that it is capable of de-rotating.

For example, as disclosed in U.S. Pat. No. 5,296,972, this device may provide an approach to the polarization issues of the K-mirror de-rotator by using more mirrors arranged in a manner that the AOI directions are distributed and cancel out the polarizations. Again, this device may have the same disadvantages in size, mass, and complexity.

The single-mirror, two-axis gimbal scanner architecture has been used on the Geostationary Operational Environmental Satellite system (GOES), instruments which are in GEO. The mechanism may require two motors and two position encoders that are mounted to drive to orthogonal axes that are mounted to the mirror in sequence to allow pointing the mirror to any position. This may be an expensive, complicated mechanism and would still not solve the problem of image plane projection rotation or polarization. The GOES instruments are single detector element instruments which are unaffected by the rotation.

The two-mirror orthogonal-axis scanner is used on the Advanced Baseline Imager (ABI), which is the most recent design of the GOES instruments. ABI also operates in a geosynchronous orbit and scans the Earth in swaths using linear detector arrays. This type of scanner does not rotate the image plane projection. Polarization effects are limited because the geosynchronous orbit distance to the Earth requires only a±10° angle range. Such a system could be used for a whisk-broom scanner; however, this would make the along-track mirror stationary and the cross-track mirror function as a paddle-wheel. This approach may only require one motor and one position encoder; however, it may suffer the same issues with polarization as the paddle-wheel scanner because of the large scan angle range required for LEO instruments.

The embodiments of present disclosure were derived by first considering the ultimate-but-unrealizable one-mirror scanner approach, which is a paddle wheel where the telescope view is directly up and the mirror reflects that view straight down to the Earth surface. Rotating the scanner shaft allows a view from one side to the other and results in the minimum AOI range that is only half of the scan look angle. This scanner scans a swath that is directly below the instrument passing through the nadir point. It also does not rotate the linear detector array as it scans across the swath. The issue with this approach is that the telescope is not transparent, which is required for the view from the scan mirror to the ground not to be obstructed by the telescope.

There are two choices to remedy the telescope obstruction. The standard paddle-wheel scanner rotates the telescope in the cross-track direction by 90° so that it views the scan mirror from the side. To point to nadir, the scan mirror is rotated to the 45° position. Scanning with this scanner yields the same projection performance as the obstructed paddle-wheel above; however, the AOI range on the scan mirror is large, which results in large variations of reflectivity and polarization across the swath. For example, scanning a typical±55° will result in a 17.5° to 72.5° AOI range.

The other choice is the rotate the telescope in the along-track direction by a small angle. This will tilt the telescope view to the scan mirror which will project its view slightly ahead in the along-track direction. The larger the tilt angle, the closer the telescope and scan mirror can be placed with obstruction, while the scanline line is moved further forward of the nominal nadir scanline. There is a design trade off to be made between these two factors. Because this tilt angle does not need to be large and is orthogonal to the scanner shaft rotation, the AOI range only grows slightly over the obstructed paddle-wheel case.

The approach does create a curved scanline relative to the nominal scanline; however, it maintains perfect alignment of the rows to the scanline allowing standard detector technologies, such as TDI to be used. The columns become non-orthogonal to the scanline as the scanner moves to the edge-of-swath.

To bring the scan line back over nadir, one can rotate the whole mechanism, so that the center of the swath is centered over nadir. This results in the scanner view pointing straight down while at the center of the swath; however, the swath does not follow a regular scan line. Note that the detector rows are still perfectly aligned with scanline.

Compare the obstructed and un-obstructed paddle-wheel column to scanline path angles. Because the column to scanline path tilt angle are on either side of orthogonal, there must exist an whole mechanism rotation angle that will make the columns orthogonal to the scanline path while maintaining row alignment to the scanline. The scanline path will still deviate from the nominal scanline and scan ahead of nadir, however not as large as the first unobstructed case. This achieves row and column to scanline angle objectives but does not follow a nominal scanline path. This approach may be useful where the first two objectives are important, but the path is not.

Ideally, the scanline path should follow a nominal scanline path as defined by nadir line of a past, present or future instrument location. Also, the ideal approach will align the detector array row projections with the scanline path and make the columns orthogonal to the path.

The above realizable tilted-shaft paddle-wheel approaches do not follow a nominal scanline path, which is defined as following the cross-track path that is orthogonal to the instrument track and passes through nadir. It is acceptable for many remote sensing applications that a nominal scanline path for the past or a future instrument position be collected as long as the angle of view is not significantly changed from the directly overhead position. To meet that objective, it may be required that the scan mirror be mounted at an angle to the tilted shaft. This addition order of freedom provides the capability to create these type of scanner approaches.

Figure 4:
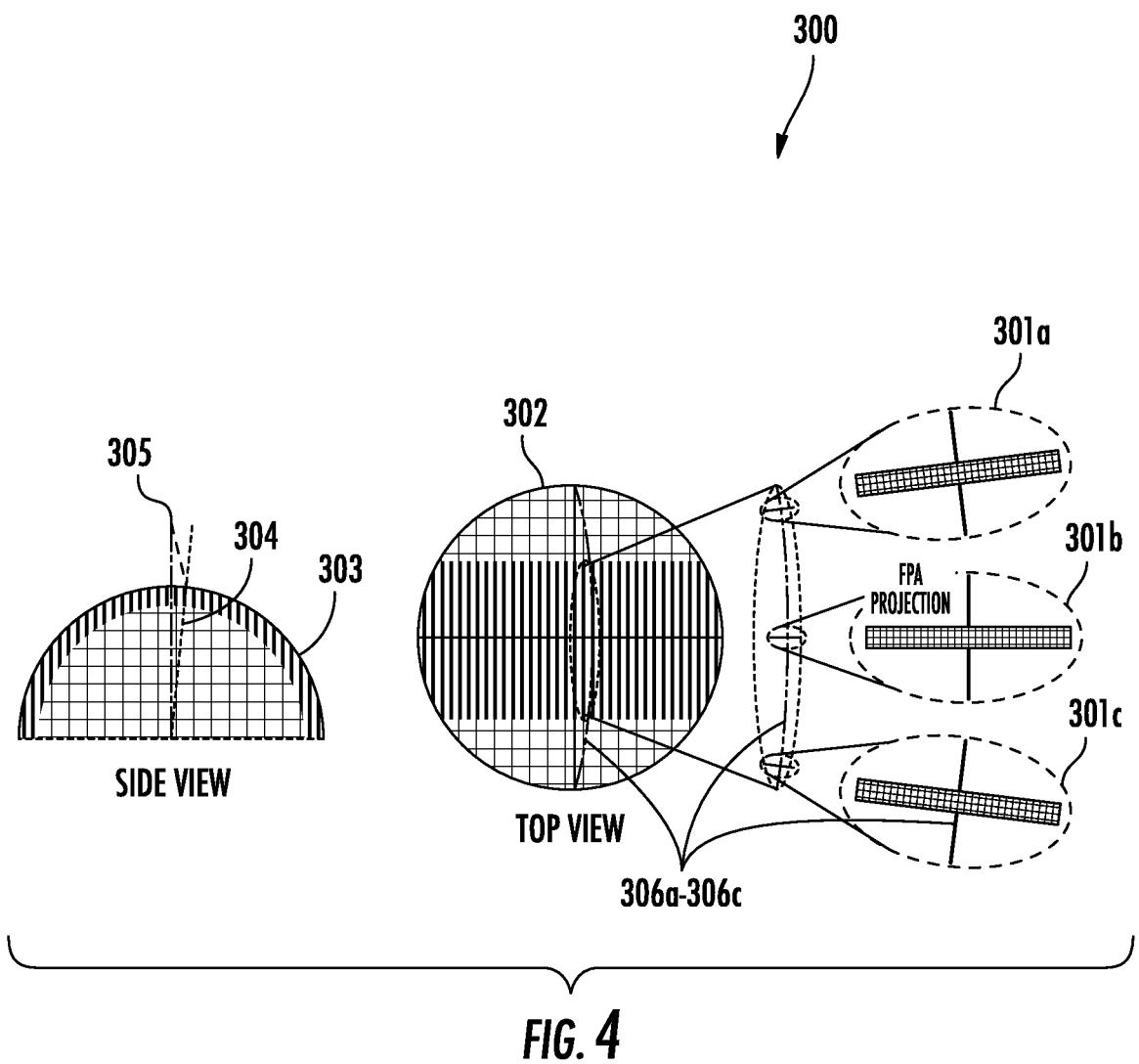
FIG. 4 is a diagram of swath scanline geometry from the airborne device of FIG. 1.
Figure 5:
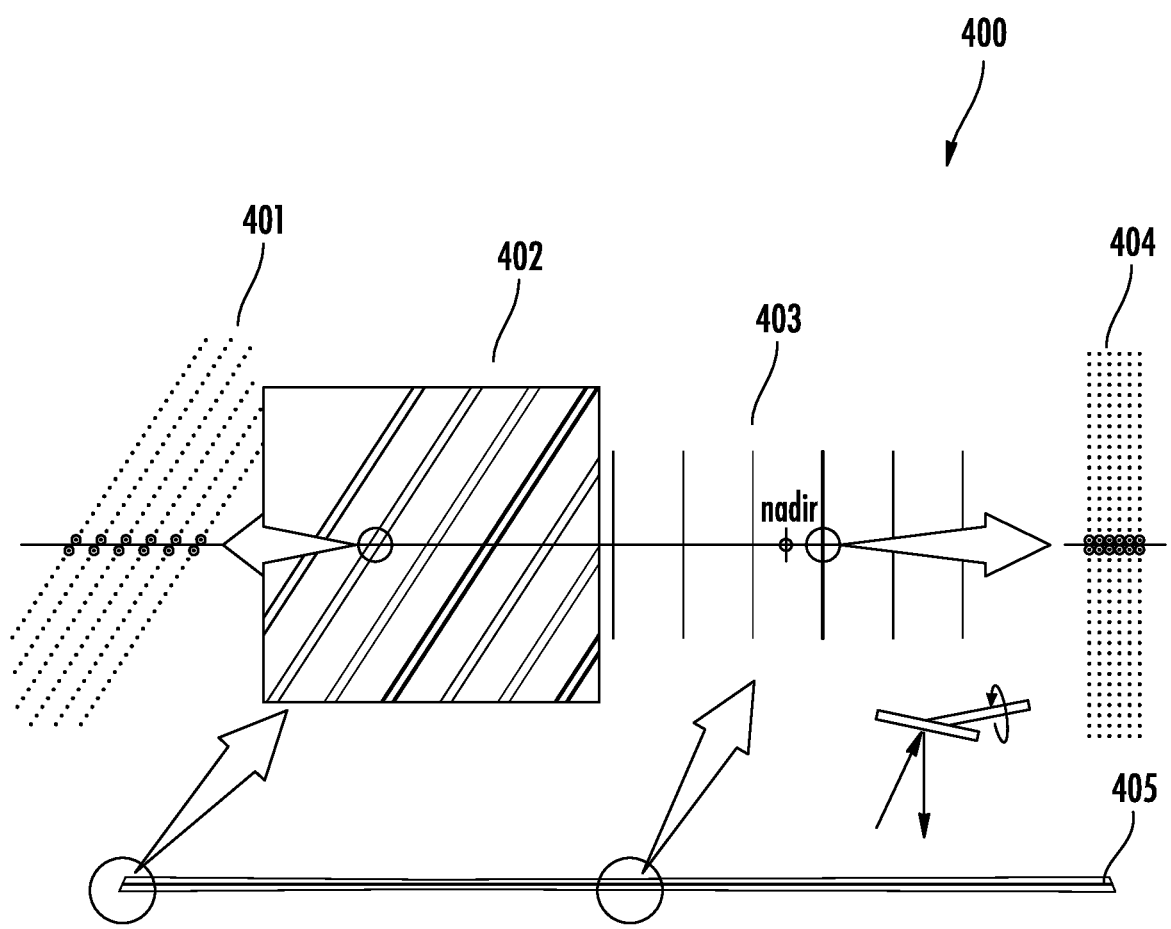
FIG. 5 is a diagram of nadir swath scanline from the airborne device of FIG. 1.

Referring now to diagrams 300, 400 of FIGS. 4 and 5, respectively, the following example is one such scanner approach, where the view from the telescope is tilted, the scanner shaft is tilted, and the scan mirror is mounted to the shaft at an angle. In the side view 303, element 305 represents the current instrument location and element 304 represents a future location. The vertical patterned region represents the Earth surface that is collected. This region corresponds to the middle region in the top view 302. The current swath being collected from 305 is highlighted as 306a, which is magnified in 306b and further magnified in 306c. Note that this swath region would have been collected from the point of view of 304 if using a nominal nadir swath. Note that the projection of the FPA represented by the grid patterns in 301a-301c is aligned with the scanline path indicated by the elements with bolded lead lines.

Item 405 in the diagram 400 represent a single swath that is collected by an embodiment that has been optimized for FPA projection row alignment and following a nominal nadir scanline. Note that the swath height grows slightly towards the ends due to the curvature of the Earth. Item 403 magnifies the middle of the swath and 404 provides further magnification. The vertical lines in 403 represent the projection of the FPA at different locations across the swath.

Note that these are spaced graphical clarity and do not necessarily represent consecutive pixel collection intervals.

Item 404 represent an FPA projection at a single location in the swath collection. The dots represent individual detector elements of the FPA. The horizontal line represents the swath scanline. The circled dots represent two rows at the center of the FPA. Note that the FPA row are aligned with the scanline and that the FPA columns are perpendicular to the scanline. Items 402 and 401 represent magnification of the swath at the edge of scan. Note that the projected FPA columns are at an angle to the scanline, however the projected FPA rows are still well aligned with the scanline. It is this feature of this optimized embodiment that allowed detector column select and TDI to be used.

This approach closely follows the nominal scanline for a position slightly in the future while minimizing the row to scanline tilt, however the columns are tilted. This may be acceptable for application where to column tilt is not crucial. Also, since the sample space grows toward the edge of swath as a matter of projection to the Earth surface, having tilted columns recovers some of that ground sample spacing growth.

Another example approach sets scan mirror to be horizontal and just tilts shaft and telescope view. This approach looks ahead but keep columns aligned with track. The row to scanline tilt is still minimized and scanline deviation is less than the tilted, unobstructed paddle-wheel. Note that keeping the columns aligned with the track of the instrument path while maintaining good row to scanline path angle may reduce the resampling processing required to place pixels in the desired cross-track grid location.

Compare these tilted-shaft scanner approaches to the 45-degree barrel roll scanner performance. Note that only the nominal nadir scanline path objective is met, while creating extreme row and column to scanline path angles.

Referring again to FIG. 2, a vector analysis is presented and used to discover and analyze an example embodiment of the scanning instrument 104. These equations were implemented in Matlab (as available from The MathWorks, Inc. of Natick, Mass.) to search for optimal approaches that included the telescope to scan mirror required separation, the AOI, the projection onto the ground of the scan pattern and its related characteristics such as the row-to-scanline angle, the column-to-scanline orthogonality and scanline path deviation. Note that even that the figure shown is tilted in a manner that would suggest type of approaches shown in the example above, the tilt angles can span the full range that may result in other scan patterns with other properties.

A: Along-track scan mirror aperture dimension
$\phi_{t,3}$: View angle of telescope into the scanner
$\phi_{s,2}$: shaft tilt angle
$\theta_s$: shaft rotation angle
$\theta_{m,1}$: mirror to shaft tilt angle
$\phi_{AT}$: Along-track angular swath height
$\eta$: Scan mirror normal vector
AOI: Angle of incidence on the scan mirror
$\phi_n$: Scan mirror normal angle at nadir
$\hat{v}_i$: scan mirror incident ray vector
$\hat{v}_r$: scan mirror reflected ray vector
$d_{min}$: Ray clearance distance (minimum mirror separation)
$\phi_E$: Along-track look-angle to the Earth at nadir Vector analysis is used to trace the projection of a point on the focal plane of the imaging system through the scanner subsystem to the Earth surface. The direction vector for the ray of point (x, y) on the focal plane through the telescope with an effective focal length f is calculated as the vector incident on the scan mirror.

$$\hat{v}_i = \frac{1}{\sqrt{x^2+y^2+f^2}} \begin{bmatrix} 1 & 0 & 0 \\ 0 & \cos\phi_{t,3} & -\sin\phi_{t,3} \\ 0 & \sin\phi_{t,3} & \cos\phi_{t,3} \end{bmatrix} \begin{bmatrix} x \\ y \\ f \end{bmatrix} = \begin{bmatrix} x \\ y\cos\phi_{t,3} - f\sin\phi_{t,3} \\ y\sin\phi_{t,3} + f\cos\phi_{t,3} \end{bmatrix}$$

Equation 1

The first step to calculate the reflection of this ray vector off the scan mirror is to calculate the mirror surface normal vector given the state of scanner shaft rotation and the other tilt angles. The order of the rotations allows the rotations to be expressed around the various standard coordinate axes. The initial position has the mirror normal pointing down in the negative z direction with no tilts or rotations. From that position, tilt the mirror from the shaft around the x-axis, then rotate the shaft around the y-axis, and finally tilt the shaft around the x-axis.

$$\hat{\eta} = \begin{bmatrix} 1 & 0 & 0 \\ 0 & \cos\phi_{s,2} & -\sin\phi_{s,2} \\ 0 & \sin\phi_{s,2} & \cos\phi_{s,2} \end{bmatrix} \begin{bmatrix} \cos\theta_s & 0 & -\sin\theta_s \\ 0 & 1 & 0 \\ \sin\theta_s & 0 & \cos\theta_s \end{bmatrix} \begin{bmatrix} 1 & 0 & 0 \\ 0 & \cos\phi_{m,1} & -\sin\phi_{m,1} \\ 0 & \sin\phi_{m,1} & \cos\phi_{m,1} \end{bmatrix} \begin{bmatrix} 0 \\ 0 \\ -1 \end{bmatrix}$$

Equation 2

This sequence of rotation of the scan mirror can be reduced to a simple vector expression.

$$\hat{\eta} = \begin{bmatrix} 1 & 0 & 0 \\ 0 & \cos\phi_{s,2} & -\sin\phi_{s,2} \\ 0 & \sin\phi_{s,2} & \cos\phi_{s,2} \end{bmatrix} \begin{bmatrix} \cos\theta_s & 0 & -\sin\theta_s \\ 0 & 1 & 0 \\ \sin\theta_s & 0 & \cos\theta_s \end{bmatrix} \begin{bmatrix} 0 \\ \sin\phi_{m,1} \\ -\cos\phi_{m,1} \end{bmatrix}$$

$$\hat{\eta} = \begin{bmatrix} 1 & 0 & 0 \\ 0 & \cos\phi_{s,2} & -\sin\phi_{s,2} \\ 0 & \sin\phi_{s,2} & \cos\phi_{s,2} \end{bmatrix} \begin{bmatrix} \sin\theta_s\cos\phi_{m,1} \\ \sin\phi_{m,1} \\ -\cos\theta_s\cos\phi_{m,1} \end{bmatrix}$$

$$\hat{\eta} = \begin{bmatrix} \sin\theta_s\cos\phi_{m,1} \\ \cos\phi_{s,2}\sin\phi_{m,1} + \sin\phi_{s,2}\cos\theta_s\cos\phi_{m,1} \\ \sin\phi_{s,2}\sin\phi_{m,1} - \cos\phi_{s,2}\cos\theta_s\cos\phi_{m,1} \end{bmatrix}$$

Equation 3

Reflecting the incident ray vector to the ray vector that points toward the Earth involves a dot product between the incident vector and the scan mirror normal.

$$\hat{v}_r = \hat{v}_i - 2(\hat{v}_i \cdot \hat{\eta})\hat{\eta}$$

Equation 4

The intersection of the reflected ray vector on the Earth surface first requires solving for the length of the Earth viewing vector which is in the direction of the reflected ray, then converting this to a vector whose base starts at the Earth center. Note that this calculation assumes a spherical Earth. This approximation is valid for local calculations where the Earth radius is adjusted for the current orbit position. The Earth radius varies from 6356.8 km at the poles to 6378.1 km at the equator. The average Earth radius 6371 km is typically used for calculating the orbit radius.

$$D = -R_{orbit}\hat{v}_{r,z} - \sqrt{R_{orbit}^2 \hat{v}_{r,z}^2 + R_{Earth}^2 - R_{orbit}^2} \qquad \text{Equation 5}$$

$$\vec{v}_E = D\hat{v}_r + \begin{bmatrix} 0 \\ 0 \\ R_{orbit} \end{bmatrix} \qquad \text{Equation 6}$$

Because this scanner approach allows for scanning ahead or behind the nadir position, to convert the vector into the orientation of this future or past scanline one can rotate the coordinate system to the effective scanline position defined by the nadir look angle.

$$\vec{v}_E' = \begin{bmatrix} 1 & 0 & 0 \\ 0 & \cos\alpha_{nadir} & -\sin\alpha_{nadir} \\ 0 & \sin\alpha_{nadir} & \cos\alpha_{nadir} \end{bmatrix} \vec{v}_E \qquad \text{Equation 7}$$

where $$\alpha_{nadir} = \sin^{-1}\left(\frac{Rorbit}{Rearth}\sin\phi_{nadir}\right) - \phi_{nadir} \qquad \text{Equation 8}$$

$$\phi_{nadir} = 2(\phi_{s,2} + \phi_{m,1}) - \phi_{t,3}. \qquad \text{Equation 9}$$

The AOI on the scan mirror for any position is calculated using the definition of the dot product between the incident ray vector and the mirror normal, both of which are unit vectors requiring no normalization. Note that the angle units are determined by the form of the arccosine used.

$$\text{AOI} = \cos^{-1}(\hat{v}_i \cdot \hat{n}) \qquad \text{Equation 10}$$

Define the swath along-track (AT) and cross-track (CT) location as distance from the instrument track for the CT coordinate and the distance from the nominal nadir scanline for the AT coordinate.

$$CT = R_E \sin^{-1}\frac{\vec{v}_{E,x}'}{\vec{v}_{E,z}'} \qquad \text{Equation 11}$$

$$AT = R_E \sin^{-1}\frac{\vec{v}_{E,y}'}{\vec{v}_{E,z}'} \qquad \text{Equation 12}$$

The minimum separation distance between the telescope or fold mirror and the scan mirror is dependent on the optical path diameter at the scan mirror, the tilt angles of the components and the angular swath height in the along-track direction.

$$d_r = \frac{A}{2\tan\left(\phi_{s,2} + \phi_{m,1} - \phi_{t,3} + \frac{\phi_{AT}}{2}\right)} \qquad \text{Equation 13}$$

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

That which is claimed is:

1. An airborne scanning instrument comprising:
   a single scanning mirror configured to be carried by an airborne platform and having a major reflective surface to define a scanning path directed toward Earth, the airborne platform comprising one of a low earth orbit (LEO) satellite platform or a medium earth orbit (MEO) satellite platform;
   a single shaft configured to rotate said single scanning mirror about a shaft axis, said major reflective surface of said single scanning mirror tilted at a first angle from the shaft axis, the shaft axis tilted at a second angle relative to horizontal; and
   a detector aligned with said single scanning mirror to define a detector path therewith, the detector path being tilted at a third angle relative to a nadir line, the third angle being within a range of 0°-45°;
   the first angle, the second angle, and the third angle being aligned with a plane of said shaft and the nadir line.

2. The airborne scanning instrument of claim 1 comprising a motor coupled to said single shaft, and a controller configured to operate said motor for scanning.

3. The airborne scanning instrument of claim 1 comprising an optical element between said single scanning mirror and said detector.

4. The airborne scanning instrument of claim 3 wherein said optical element comprises at least one of a telescope and a fold mirror.

5. The airborne scanning instrument of claim 1 wherein the first angle is within a range of 0°-45°.

6. The airborne scanning instrument of claim 1 wherein the second angle is within a range of ±45°.

7. The airborne scanning instrument of claim 1 wherein said detector is sensitive to radiation in an optical range.

8. A satellite device comprising:
   a satellite platform comprising one of a low earth orbit (LEO) satellite platform or a medium earth orbit (MEO) satellite platform;
   a wireless transceiver carried by said satellite platform; and
   a scanning instrument carried by said satellite platform, coupled to said wireless transceiver, and comprising
      a single scanning mirror having a major reflective surface to define a scanning path directed toward Earth,
      a single shaft configured to rotate said single scanning mirror about a shaft axis, said major reflective surface of said single scanning mirror tilted at a first angle from the shaft axis, the shaft axis tilted at a second angle relative to horizontal, and
      a detector aligned with said single scanning mirror to define a detector path therewith,
      the detector path being tilted at a third angle relative to a nadir line, the third angle being within a range of 0°-45°,
      the first angle, the second angle, and the third angle being aligned with a plane of said shaft and the nadir line.

9. The satellite device of claim 8 wherein said scanning instrument comprises a motor coupled to said single shaft, and a controller configured to operate said motor for scanning.

10. The satellite device of claim 8 wherein said scanning instrument comprises an optical element between said single scanning mirror and said detector.

11. The satellite device of claim 10 wherein said optical element comprises at least one of a telescope and a fold mirror.

12. The satellite device of claim 8 wherein the first angle is within a range of 0°-45°.

13. The satellite device of claim 8 wherein the second angle is within a range of ±45°.

14. The satellite device of claim 8 wherein said detector is sensitive to radiation in an optical range.

15. A method of making an airborne scanning instrument, the method comprising:
positioning a single scanning mirror to be carried by an airborne platform and having a major reflective surface to define a scanning path directed toward Earth, the airborne platform comprising one of a low earth orbit (LEO) satellite platform or a medium earth orbit (MEO) satellite platform;
coupling a single shaft to rotate the single scanning mirror about a shaft axis, the major reflective surface of the single scanning mirror tilted at a first angle from the shaft axis, the shaft axis tilted at a second angle relative to horizontal; and
aligning a detector with the single scanning mirror to define a detector path therewith, the detector path being tilted at a third angle relative to a nadir line, the third angle being within a range of 0°-45°;
the first angle, the second angle, and the third angle being aligned with a plane of the shaft and the nadir line.

16. The method of claim 15 comprising coupling a motor to the single shaft, and coupling a controller to operate the motor for scanning.

17. The method of claim 15 comprising coupling an optical element between the single scanning mirror and the detector.

18. The method of claim 17 wherein the optical element comprises at least one of a telescope and a fold mirror.

19. A method of operating an airborne scanning instrument, the method comprising:
providing a single scanning mirror to be carried by an airborne platform, the single scanning mirror having a major reflective surface to define a scanning path directed toward Earth, the airborne platform comprising one of a low earth orbit (LEO) satellite platform or a medium earth orbit (MEO) satellite platform;
rotating the single scanning mirror via a single shaft and about a shaft axis, the major reflective surface of the single scanning mirror tilted at a first angle from the shaft axis, the shaft axis tilted at a second angle relative to horizontal; and
operating a detector aligned with the single scanning mirror to define a detector path therewith, the detector path being tilted at a third angle relative to a nadir line, the third angle being within a range of 0°-45°;
the first angle, the second angle, and the third angle being aligned with a plane of the shaft and the nadir line.

20. The method of claim 19 comprising operating a motor coupled to the single shaft for scanning.

21. The method of claim 19 comprising operating an optical element between the single scanning mirror and the detector.

22. The airborne scanning instrument of claim 1 wherein said detector is sensitive to radiation in an infrared range.

23. The method of claim 15 wherein the detector is sensitive to radiation in an infrared range.

24. The airborne scanning instrument of claim 1 wherein the horizontal is aligned with a horizontal of the airborne scanning instrument.

25. The satellite device of claim 8 wherein the horizontal is aligned with a horizontal of the airborne scanning instrument.

26. The method of claim 15 wherein the horizontal is aligned with a horizontal of the airborne scanning instrument.

27. The method of claim 19 wherein the horizontal is aligned with a horizontal of the airborne scanning instrument.

* * * * *